United States Patent [19]
Fagen et al.

[11] Patent Number: 5,805,900
[45] Date of Patent: Sep. 8, 1998

[54] METHOD AND APPARATUS FOR SERIALIZING RESOURCE ACCESS REQUESTS IN A MULTISYSTEM COMPLEX

[75] Inventors: Scott Andrew Fagen, Poughkeepsie; Jeffrey Alan Frey, New Paltz; Carroll Eugene Fulkerson, Jr., Poughkeepsie, all of N.Y.; Mark Albert Kowalski, Austin, Tex.; Benjamin John North, Ballsbridge, Ireland

[73] Assignee: International Business Machines Corporation, Armonk, N.Y.

[21] Appl. No.: 717,998

[22] Filed: Sep. 26, 1996

[51] Int. Cl.$^6$ .............................. G06F 9/46; G06F 13/14
[52] U.S. Cl. ...................... 395/727; 395/726; 395/292; 395/608
[58] Field of Search ..................... 395/287, 288, 395/289, 290, 726, 727, 728, 731, 732, 856, 857, 858, 859, 862, 865, 876, 872, 875, 670, 608, 671, 672, 674, 675, 677, 200.42–200.47, 292

[56] References Cited

U.S. PATENT DOCUMENTS

| | | | |
|---|---|---|---|
| 4,965,719 | 10/1990 | Shoens et al. . | |
| 5,175,852 | 12/1992 | Johnson et al. . | |
| 5,202,971 | 4/1993 | Henson et al. . | |
| 5,226,159 | 7/1993 | Henson et al. . | |
| 5,327,556 | 7/1994 | Mohan et al. | 395/600 |
| 5,339,427 | 8/1994 | Elko et al. . | |
| 5,410,697 | 4/1995 | Baird et al. . | |
| 5,423,044 | 6/1995 | Sutton et al. . | |
| 5,442,763 | 8/1995 | Bartfai et al. | 395/375 |
| 5,454,108 | 9/1995 | Devarakonda et al. . | |
| 5,537,574 | 7/1996 | Elko et al. | 395/468 |
| 5,551,046 | 8/1996 | Mohan et al. | 395/800 |
| 5,596,754 | 1/1997 | Lomet | 395/726 |
| 5,613,139 | 3/1997 | Brady | 395/800 |
| 5,634,122 | 5/1997 | Loucks et al. | 395/608 |
| 5,682,537 | 10/1997 | Davies et al. | 395/726 |
| 5,734,909 | 3/1998 | Bennett | 395/726 |

FOREIGN PATENT DOCUMENTS

| | | |
|---|---|---|
| 0286807 | 2/1988 | European Pat. Off. . |
| 0518639 | 6/1992 | European Pat. Off. . |

OTHER PUBLICATIONS

"Distributed Locking Facility for Multi–System Data Sharing" by Lui, IBM Technical Disclosure Bulletin, vol. 31 No. 1 Jun. 1988.
"Token Ring–Based Distributed Lock Manager" by Dias et al., IBM Technical Disclosure Bulletin, vol. 30 No. 7 Dec. 1987.
"Shared Disk, UNIX–Based, Cluster File System" by Devarakonda et al. IBM Technical Disclosure Bulletin, vol. 37 No. 06B Jun. 1994.
"Update Locks–New Consistency Control Technique for Distributed Data" by Cohn et al., IBM TDB, vol. 36 No. 12 Dec. 1993.

(List continued on next page.)

*Primary Examiner*—Ayaz R. Sheikh
*Assistant Examiner*—Raymond N. Phan
*Attorney, Agent, or Firm*—William A. Kinnaman, Jr.

[57] ABSTRACT

A method and apparatus for serializing a request for access to a resource originating from a requester in a system of a multisystem complex. Each system of the complex maintains local contention data indicating contention between requesters on that system for access to the resource, as well as a local contention summary summarizing the local contention data. A global manager for managing contention between the systems uses the local contention summaries to determine the existence of global contention for the resource. In response to a request for access to the resource originating from a requester on a system, the system determines whether the request requires an update of the local contention summary for the system. If the request does not require an update of the local contention summary, the system processes the request in accordance with the local contention data for the system. If the request does require an update of the local contention summary, the system notifying the global manager of the update and processing the request in accordance with the response received from the global manager.

28 Claims, 10 Drawing Sheets

OTHER PUBLICATIONS

"Distributed Concurrency Control Based on Limited Wait–Depth" by Franaszek et al., IBM Research Div., RC16881 (#74866) May 21, 1991, pp. 1–27.

"Implementing Locks in Distributed–Memory Multiprocessors" by E. Ammann, IBM Germany Lab., TR05.486, May 1991, pp. 1–16.

"Static and Dynamic Lock Name Space Partitioning in Multi–System Data Sharing" by Iyer et al., IBM Santa Teresa Lab., TR03.364, Mar. 1990, pp. 1–23.

"Distributed Divergence Control For Epsilon Serializability" by Pu et al., IBM Research Div., RC18725 (81925) Feb. 93, pp. 1–20.

"Distributed Divergence Control For Epsilon Serializability" by Pu et al., 0–8186–3770–6/93, 1993 IEEE, pp. 449–456.

"Transaction Management in Hydro: A MultiDataBase System" by Perrizo et al., TH0372–3/91/0000/0276, 1991 IEEE, NDSU, pp. 276–279.

"Distributed Algorithms for Multiple . . . Algorithm" by Mizuno et al., Dept of Computing & Info. Science, KSU, CH2799–5/90, IEEE p. 883.

"Locking Policies in Distributed Databases" by O. Wolfson, AT&T Bell Laboratories, CH2031–3/84/0000/0315, 1984 IEEE, pp. 315–322.

"A Concurrency Control Mechanism for a Partially Duplicated Distributed Database System" by Chou et al., Dept of Computer & Info Science, OHSU, CH1586–7/80/0000–0026, 1980 IEEE, pp. 26–34.

"Private Locking and Distributed Cache Management" by D. Lomet, DEC Cambridge Research Lab, 0–8186–6400–2/94, 1994 IEEE, pp. 151–159.

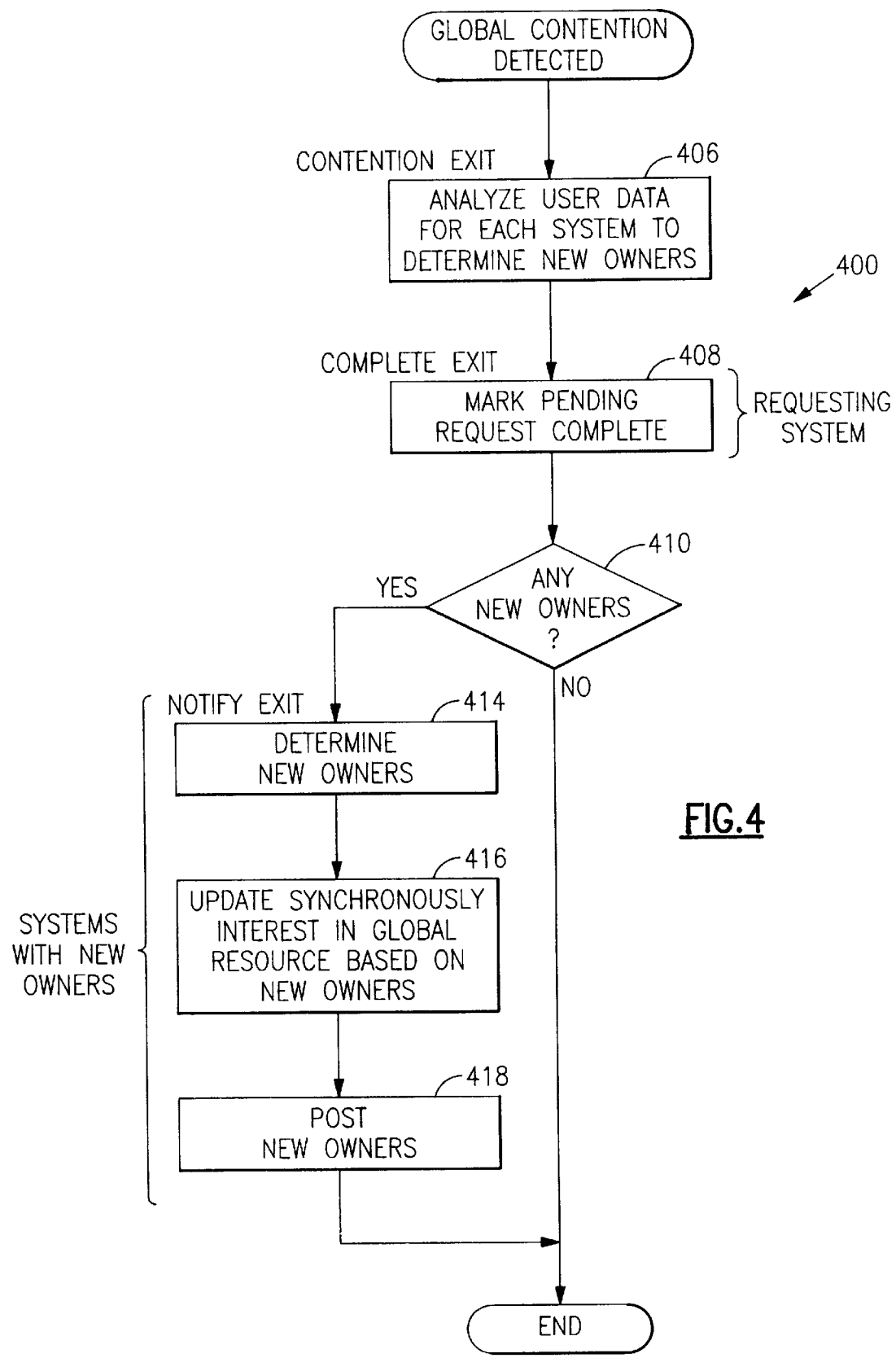

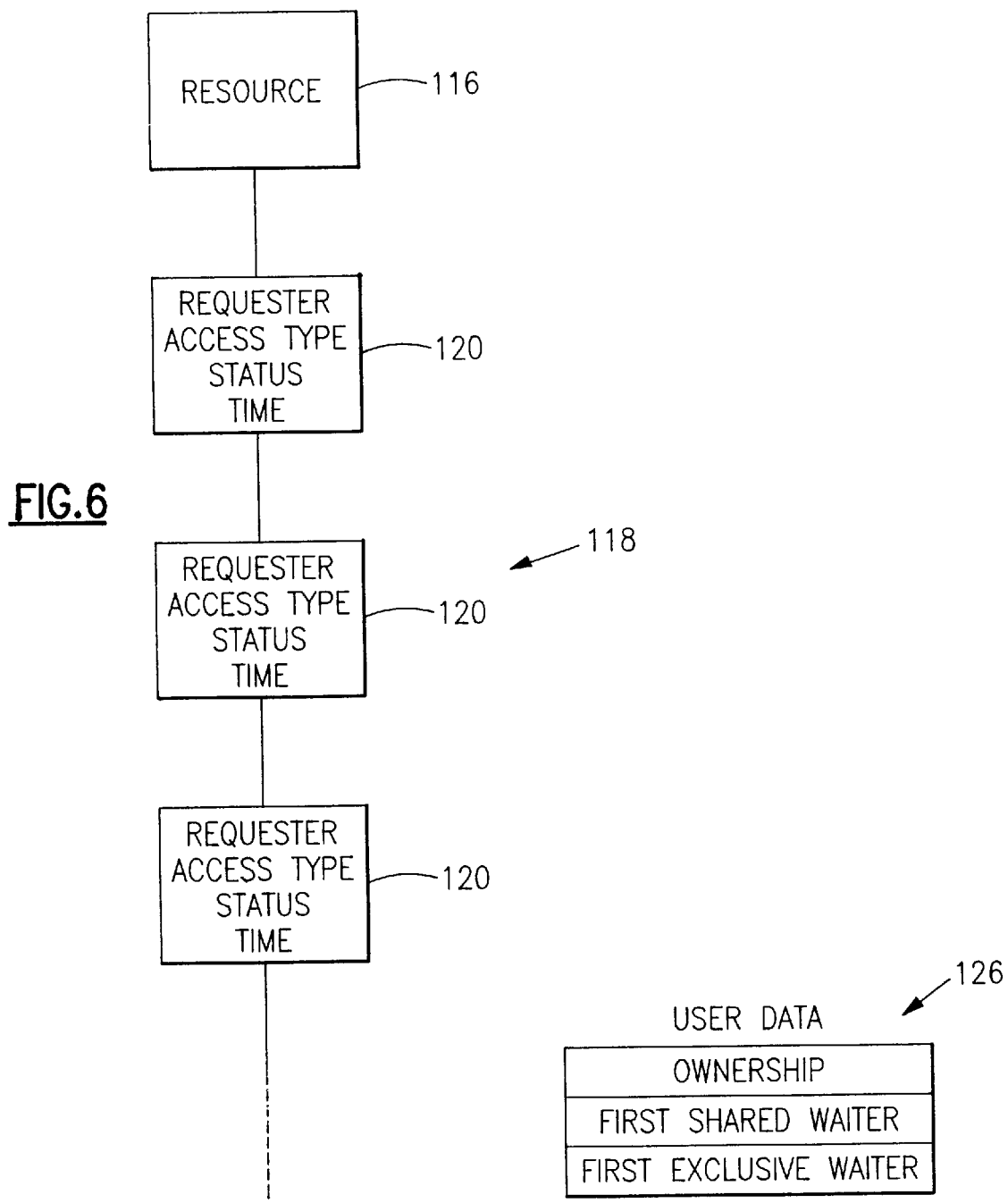

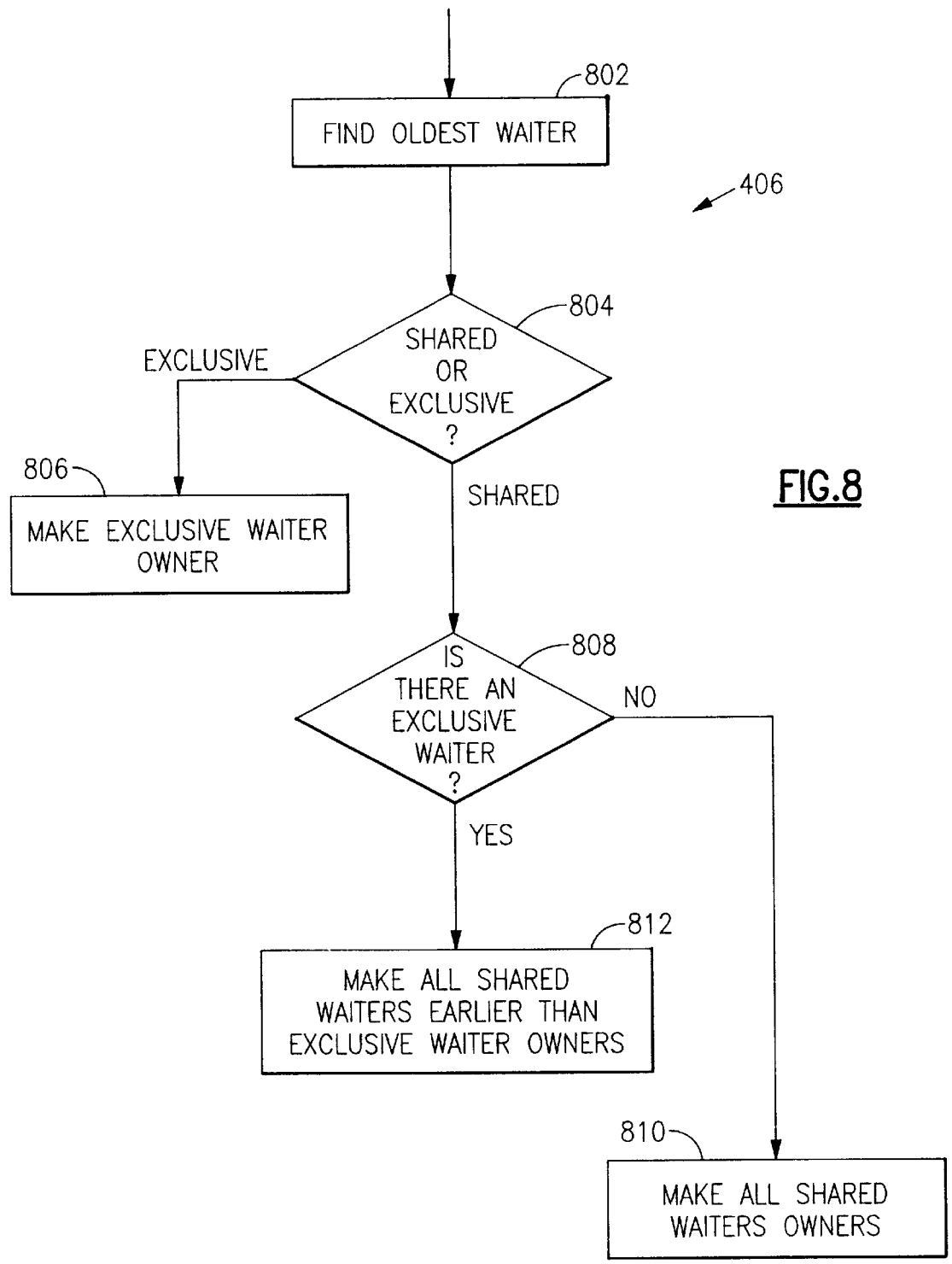

METHOD AND APPARATUS FOR SERIALIZING RESOURCE ACCESS REQUESTS IN A MULTISYSTEM COMPLEX

BACKGROUND OF THE INVENTION

1. Field of the Invention

This invention relates to a method and apparatus for serializing requests for access to a resource originating from requesters located in different computer systems across a system complex ("sysplex").

2. Description of the Related Art

Complexes of interconnected computers, sometimes referred to as "sysplexes", are well known in the art. The IBM Parallel Sysplex configuration introduced in 1994 is one recent example. (IBM and Parallel Sysplex are trademarks of IBM Corporation.) In such sysplexes, processes executing in one system of the sysplex may often have to access global resources that are available to the sysplex as a whole. Some means are obviously necessary to coordinate potentially contentious requests for resource access originating from requesters across the sysplex.

In individual systems, it is well known in the art to serialize requests for access to a system resource by using a lock manager to grant one or more requesters access to a resource while denying access to other requesters making incompatible access requests. The basic mechanism usually employed is a queue for placing resource requests that cannot be granted immediately due to earlier, incompatible requests from other processes. However, when one tries to extend this basic concept to a multisystem complex, difficulties arise as a result of the overhead associated with accessing a central queue.

The Global Resource Serialization (GRS) component of the IBM MVS/ESA operating system, which runs on the IBM System/390 (S/390) hardware platform, is a server process that provides sysplex-wide resource serialization services to any caller (via ENQ to acquire a resource and DEQ to release a resource). (MVS/ESA, System/390 and S/390 are trademarks of IBM Corporation.) It currently provides this support using a peer-coupled ring structure which allows only one member at a time to process global resource requests. This structure requires that each sysplex member have enough real and/or expanded storage available to keep a copy of the sysplex-wide global resource queues, since each system in the sysplex must be aware of the global resource requests from each of its peers in the sysplex. This structure can cause availability and throughput problems for the GRS service as the number of systems in a sysplex grows beyond, say, eight.

Other sysplex-wide serialization products that use a distributed or star structure are known in the art. However, their implementation requires a global picture of the resource queues somewhere, either on a selected system or in shared storage.

What is desired, therefore, is a resource serialization system that keeps real and expanded storage required on any one system to a minimum, improves performance of enqueuing and dequeuing requests, minimize single points of failure, and allows smooth, scalable growth beyond the limits of the prior art.

SUMMARY OF THE INVENTION

The present invention contemplates a method and apparatus for serializing a request for access to a resource originating from a requester in a system of a multisystem complex. In accordance with the invention, each system of the complex (or, more particularly, a local lock manager on each system) maintains local contention data indicating contention between requesters on that system for access to the resource, as well as a local contention summary summarizing the local contention data. A global lock manager ("global manager") for managing contention between the systems uses the local contention summaries to determine the existence of global contention for the resource.

The local contention data comprises, for each system, a queue of entries representing requesters from that system for access to the resource. Each entry in the queue indicates whether the requester currently has access to the resource, as well as whether the requester requested exclusive or shared access to the resource and the time at which the requester requested access to the resource.

The local contention summary for each system indicates whether a requester from that system has current access to the resource, whether the current access is exclusive or shared, whether a requester from the system is awaiting access to the resource, the time at which the earliest requester awaiting exclusive access to the resource requested access to the resource, and the time at which the earliest requester awaiting shared access to the resource requested access to the resource.

Additionally, the local contention summary for each system comprises a lock state that is set to exclusive if any requester on that system is requesting exclusive access to the resource.

The global manager maintains global contention data, consisting of the local contention summaries of interested systems, indicating contention between the systems for access to the resource. The resource is considered to be in global contention if two or more systems have requesters for access to the resource and the lock state of at least one of the systems is set to exclusive.

In response to a request for access to the resource originating from a requester on a system, the system determines whether the request requires an update of the local contention summary for the system; no update of the local contention summary is required if there are currently any waiters on the system for the requested mode of access to the resource. If the request does not require an update of the local contention summary, the system processes the request in accordance with the local contention data for the system. If the request does require an update of the local contention summary, the system notifies the global manager of the update and processes the request in accordance with a response from the global manager indicating the presence or absence of global contention for the resource.

The notifying system commits the update and processes the request in accordance with the local contention data if the response indicates the absence of global contention for the resource. On the other hand, if the response indicates the presence of global contention, the notifying system denies the request and, if the update makes the requester an owner of the resource, cancels the update as well.

Upon receiving a notification of an update from a system, the global manager determines whether the update leaves the resource in global contention and responds to the system accordingly. The global manager also updates the global contention data in accordance with the update of the local contention summary. However, if the proposed update of the local contention summary makes the system an owner of the resource and the resource is in global contention, the global manager updates the global contention data to make the system a waiter for the resource rather than an owner.

In response to a request to release a resource, the system of the requester operates in a similar manner, determining whether the request requires an update of the local contention summary and notifying the global manager if it does. The global manager, upon receiving such a notification, determines whether the resource was previously in global contention. If the resource was not previously in global contention (i.e., there were no waiters for the resource), the global manager simply transmits a response to that effect to the requester. On the other hand, if the resource was previously in global contention and a DEQ request changes the global contention data in such a manner as to permit promotion of a waiter (i.e., the only owner dequeues or an exclusive waiter that was blocking a shared waiter dequeues), the global manager identifies (at the system level) and notifies new owners.

To identify new owners, the global manager determines the system having the oldest waiter for access to the resource. If the oldest waiter is awaiting exclusive access to the resource, the global manager notifies the system having the oldest waiter that the resource is available. If the oldest waiter is awaiting shared access to the resource, the global manager determines whether any system has a waiter for exclusive access to the resource. If no system has an exclusive waiter, the global manager notifies all systems with waiters that the resource is available for all waiters. On the other hand, if any system has an exclusive waiter, the global manager notifies those systems with waiters older than the exclusive waiter that the resource is available for waiters older than the exclusive waiter.

Each system with waiters, upon being notified that the resource is available for all waiters, notifies all waiters on the system that the resource is available. On the other hand, each system with waiters that are older than the exclusive waiter, upon being notified that the resource is available for waiters that are older than the exclusive waiter, notifies only those waiters on the system that are older than the oldest exclusive waiter that the resource is available.

Each local lock manager uses the global lock manager in the manner described above, distributing the information and management of resource serialization across the sysplex. The structure of the local lock managers is changed from a peer-coupled ring to a star with a local lock manager on each point and the global lock manager in the middle. Each local lock manager is now responsible for managing only its global resource requests. Global resource requests from other systems in the sysplex will no longer be replicated on every system. A sysplex-wide view of resource contention will be kept in the global lock manager, but sysplex-wide global resource queues will not be kept.

This is accomplished as described above by having the global lock manager use global contention data based on a compressed view of the local contention data (i.e., the local contention summaries) to manage global contention. This compressed view is evaluated by a contention manager scheduled by the global lock manager to determine which requesters should be the next to own the resource.

This structure allows the local lock managers to solve the previously mentioned problems. The real and expanded storage required on any one system is minimized by requiring each system to manage only its own global resource requests. Each system does not need to keep information about the global requests of its peer members.

The performance of ENQ and DEQ requests is improved in several ways. Resource request overlap is eliminated by removing the ring structure and the requirement that each global request must be "seen" by each peer local lock manager before a response can be presented to the requester. As soon as local lock manager gets a response back from the global lock manager, it can respond to the requester. This will almost always be a synchronous high-speed access that does not involve the other members of the sysplex.

By using the global lock manager to keep track of only global contention and not every global resource request, the number of global lock manager accesses can be kept to a minimum. Once contention is registered in the global lock manager and reflected in the resource queues on each system, a local lock manager can process some global resource requests without invoking the global lock manager.

Single points of failure are minimized since each local lock manager is managed as a single entity. There are no dependencies on passing data from one local lock manager to another to complete a request. The failure of one local lock manager does not impact the ability of the remaining systems in the sysplex to process and respond to ENQ and DEQ requests. The failing system is removed from the sysplex and the global lock manager will manage contention changes due to the failure. The peer local lock managers do not need to "rebuild" the ring structure or remove resource requests originating on the failing system from their local copy of the resource queues.

The present invention allows local lock managers to provide smooth scalable growth well beyond the limits of the prior art. It is a truly distributed solution requiring minimal storage and processing capabilities on the individual members in a sysplex. This simplifies the hardware configuration and eliminates the need for a "take over" of some global function or data in case of failure.

BRIEF DESCRIPTION OF THE DRAWINGS

FIG. 4 show the procedure for resolving global resource contention when detected.

FIG. 6 shows a resource queue associated with a particular system for a particular resource.

FIG. 7 shows the user data summarizing the status of the resource queue.

FIG. 8 shows the method used by the procedure of FIG. 4 to identify new owners.

DESCRIPTION OF THE PREFERRED EMBODIMENT(S)

1. General Sysplex Configuration

Figure 1:
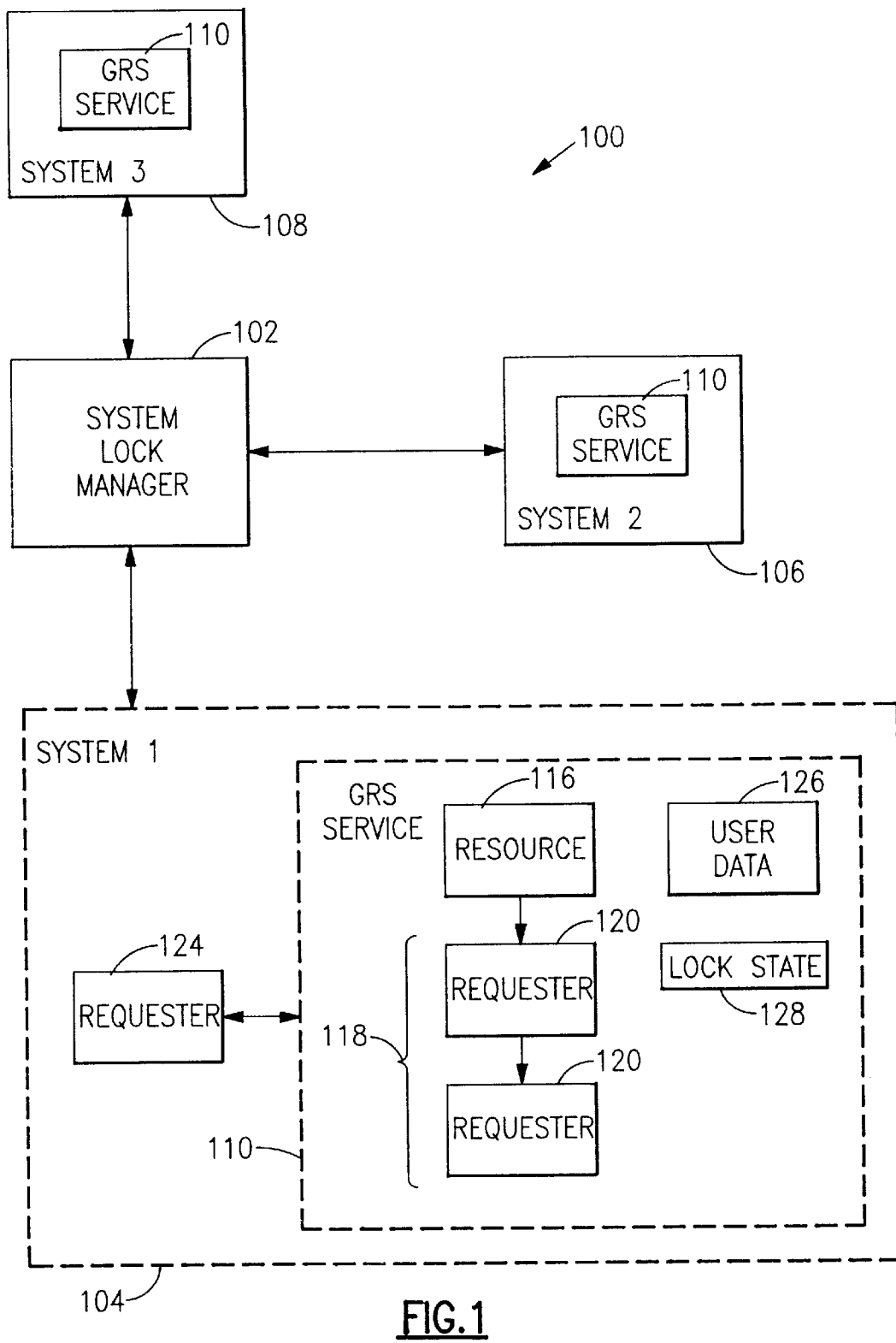
FIG. 1 is a schematic block diagram of a computer system complex in which the present invention is used.

Referring first to FIG. 1, the present invention is used in a computer system complex ("sysplex") 100 comprising a system lock manager (SLM) 102 to which individual computer systems 104, 106, 108 (also sometimes referred to herein as Systems 1–3) are interconnected in a "star" configuration. Although FIG. 1 shows three systems 104–108, the particular number of systems in the sysplex 100 is unimportant as far as the present invention is concerned.

System lock manager 102, which functions in the disclosed sysplex 100 as a global (i.e., sysplex-wide) lock manager, maintains a centralized set of global resource contention and locking information, as described further below.

System lock manager 102 and GRS services 110 may be implemented as any suitable combination of hardware and software. The internals of the GRS services 110 and system lock manager 102, including the particular data structures used to store local and global contention data, form no part of the present invention except as specifically set forth herein; any suitable internal organization and data structures may be used. Suitable internal organizations and data structures are described, however, in commonly assigned Elko et al. U.S. Pat. No. 5,339,427, incorporated herein by reference.

Each of systems 104–108 contains one or more central processors, main memory, and various input/output (I/O) devices such as magnetic disk drives, tape drives, printers, terminals and the like. Since these system components operate conventionally in the present embodiment, they are not separately shown.

Each system 104–108 may have one or more processes running thereon, such as process 124 on system 104, which may request access to a resource 116. Resource 116 may be a region of main memory or one of the peripheral I/O devices referred to above. Although resource 116 is shown in FIG. 1 as being part of the same system 104 as the requesting process 104, this is not necessarily the case, and resource 116 may belong instead to another system 106 or 108 or to the sysplex 100 as a whole. The type of access to resource 116 requested by process 124 may be either shared (as for read access to a main memory area) or exclusive (as for access to an output device such as a printer or write access to a storage device).

Each system 104, 106, 108 has (as a part of the operating system in the embodiment shown) a global resource serialization (GRS) service 110. Each GRS service 110 functions in the disclosed sysplex 100 as a local (i.e., system-specific) lock manager and maintains, for each resource 116 currently having a requester on the system, a queue 118 of entries 120 representing local processes requesting access to the resource. Queue 118 constitutes local contention data indicating the contention status between requesters on the system for access to the resource 116. Thus, referring also to FIG. 6, each entry 120 in queue 118 contains information identifying the requesting process 124, the type of access requested (shared or exclusive), the status of the request (owner or waiter), and the time at which the request was made. GRS service 110 uses queue 118 to manage competing requests for access to resource 116 originating from processes 124 on the same system.

Each GRS service 110 also maintains, for each resource 116 currently defined to the system, a local contention summary ("user data") 126 that abstracts or summarizes the local contention data provided by the queue 118. Thus, referring to FIG. 7, the user data 126 for each resource 116 specifies the current ownership of the resource (shared, exclusive, or none), the time at which the first shared waiter (if any) joined the queue 118, and the time at which the first exclusive waiter (if any) joined the queue.

In addition to user data 126, for each system there is defined a lock state 128, which is set to "exclusive" if there are any exclusive requests on the queue 118 and is otherwise set to "shared".

User data 126 and lock state 128 are used to track contention between the systems 104–108 for access to the same resource 116, in a manner to be described below.

2. ENQ Procedure

A. GRS Service

Figure 2A:
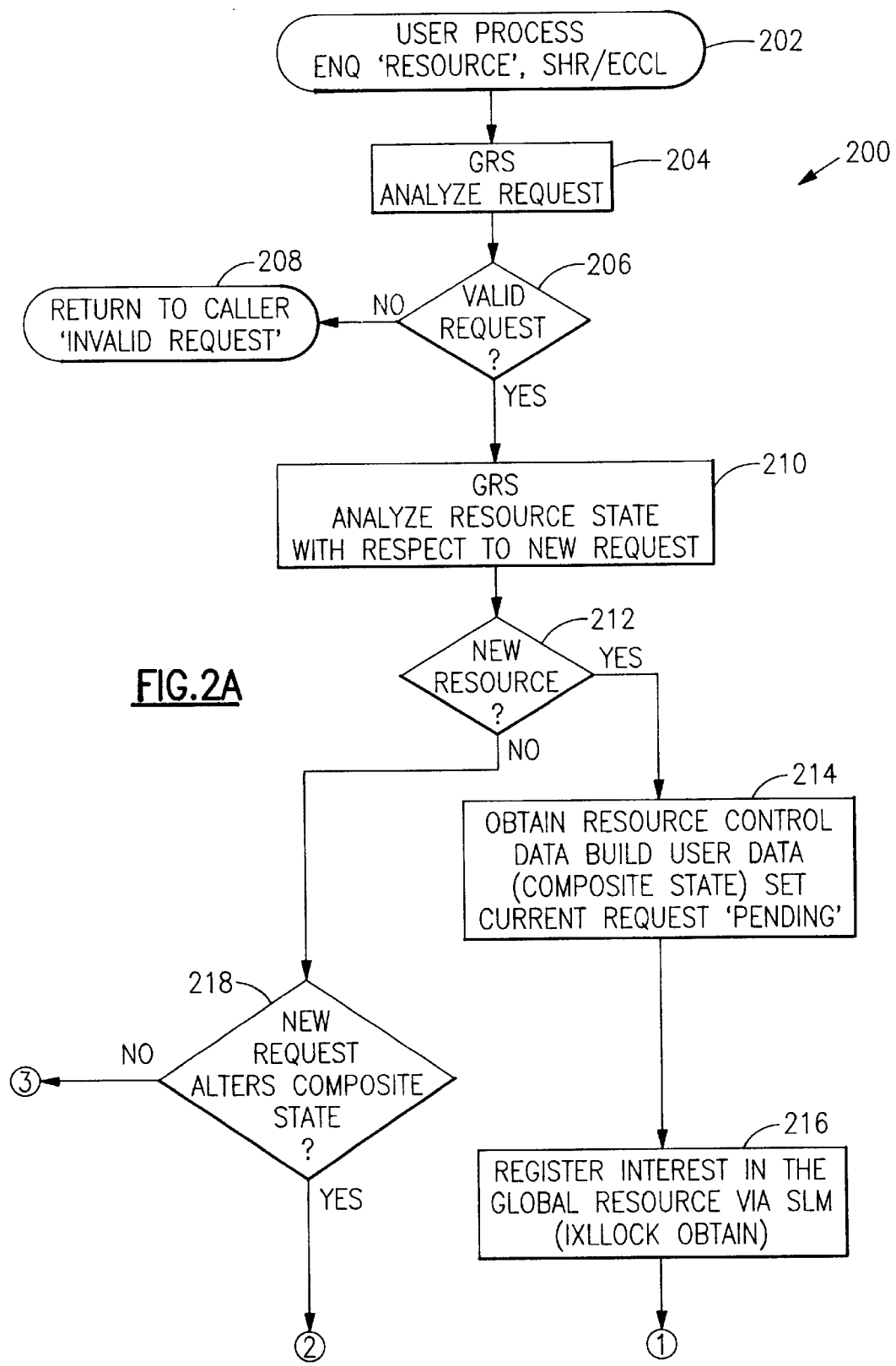
FIGS. 2A–2B show the ENQ procedure for enqueuing a resource request from a process.
Figure 2B:
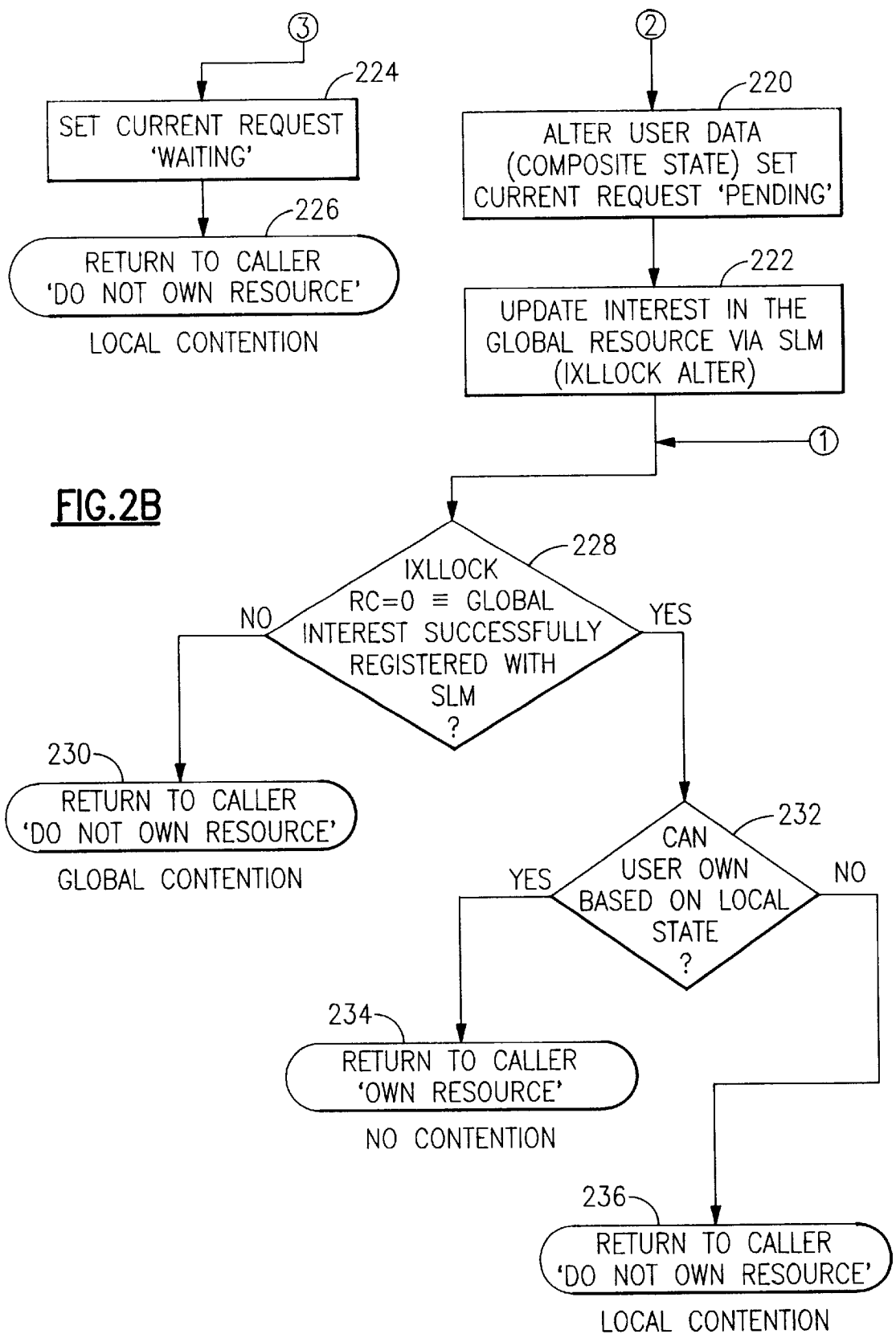

FIGS. 2A–2B show the ENQ procedure 200 invoked by a process to request access to a global resource. The ENQ procedure 200 is invoked when a process on one of the systems, e.g. requester 124 on system 104, requests a specified type of access (shared or exclusive) to a specified system resource, e.g. resource 116 (step 202). The request has the format:

ENQ ('majorname','minorname',E|S,SYSTEMS)

shown in step 202, where the keyword ENQ denotes an ENQ request, the variables 'majorname' and 'minorname' denote the global resource being accessed, the keyword E (exclusive) or S (shared) denotes the type of access requested, and the keyword SYSTEMS denotes that the request is for a global (sysplex-wide) resource. Upon receiving the request, the GRS service 110 on system 104 analyzes the request to determine whether it is valid (step 204). If the request is not valid (step 206), the GRS service 110 returns an "invalid request" code to the requester 124 (step 208). Otherwise, the GRS service 110 analyzes the resource state with respect to the request (step 210) and determines whether the target resource 116 is currently defined on the system 104 (step 212).

If the target resource 116 is not currently defined on the system 104, the GRS service 110 defines a queue 118 and user data 126 (including lock state 128) for the resource 116 and sets the current request 120 as "pending" (i.e., contingent on a response from system lock manager 102) (step 214). The requester 124 is tentatively made an exclusive or shared owner (depending on the type of access requested), subject to being downgraded to a waiter if a global conflict is detected. The lock state 128 of the resource 116 is set to "exclusive" if exclusive access is being requested; otherwise, it is set to "shared". GRS service 110 then registers its new interest in resource 116 by issuing an "obtain" command to system lock manager 102 (step 216).

If the target resource 116 is defined on the system 104, the GRS service 110 determines whether there are currently any waiters on that system for the requested type of access (step 218). If so, no update to the user data 126 for that system is necessary, since the requester cannot be made an owner (because of the presence of the waiter) and there is already a first waiter. Accordingly, the requester 124 is immediately placed on the queue 118, with the time of the request and the type of access requested noted in the queue entry 120, and the current request set to "waiting" (i.e., a waiter on the queue) (step 224). GRS service 110 then notifies the requester 124 that it does not own the resource 116 (step 226). No communication with the system lock manager 102 is necessary, since the user data 126 for the system remains unchanged.

If there are no waiters on the system for the requested type of access, both the queue 118 and the user data 126 are appropriately updated and the request is marked as pending (step 220). If the request is for exclusive access, the requester is tentatively made an exclusive owner (subject to being downgraded to an exclusive waiter if a global conflict is detected) if there are no owners or waiters on the system for either exclusive or shared access; otherwise, the requester is made an exclusive waiter. If the request is for shared access, the requester is tentatively made a shared owner (subject to being downgraded to a shared waiter if a global conflict is detected) if there are no exclusive owners on the system and there are no waiters on the system for either exclusive or shared access; otherwise, the requester is made a shared waiter. As noted above, the lock state 128 of the resource 116 is set to exclusive if there are any exclusive requests on the queue 118, otherwise the lock state 128 is set to shared. After updating its queue 118 and user data 126, the GRS service informs the system lock manager 102 of its changed interest in the resource via an "alter" command (step 222).

GRS service 100 then awaits a return code indicating whether its new or changed interest in the resource 116 has been successfully registered with the system lock manager 102, i.e., whether there is a global conflict (as defined below) with any other system (step 228).

If the system lock manager 102 determines that the resource 116 is in global conflict, it sends the GRS service 110 a nonzero return code, indicating that its ownership interest has not been successfully registered with the system lock manager, but must await contention processing. In such a case, GRS service 110 leaves the request in the "pending" state (step 230) and processes the next user request. Processing for the pending request continues asynchronously with respect to the GRS service 110 as shown in FIGS. 3–4 and described below.

If the system lock manager 102 determines that the resource 116 is not in global conflict, it sends the GRS service 110 a return code of zero, indicating that its ownership interest has been successfully registered with the system lock manager (i.e., that the requested lock state 128 does not create a global conflict); upon receiving such a notification, GRS service 110 commits the updates to the local queue 118 and user data 126, which have been tentative until this time. If the updates make the requester 124 an owner (step 232), the GRS service 110 notifies the requester 124 that it owns the resource 116 (i.e., that there is no contention) (step 234). Otherwise, the updates make the requester 124 a waiter, and the GRS service notifies the requester 124 that it does not own the resource 116 (i.e., that there is local contention) (step 236).

B. System Lock Manager: Contention Processing

Figure 3:
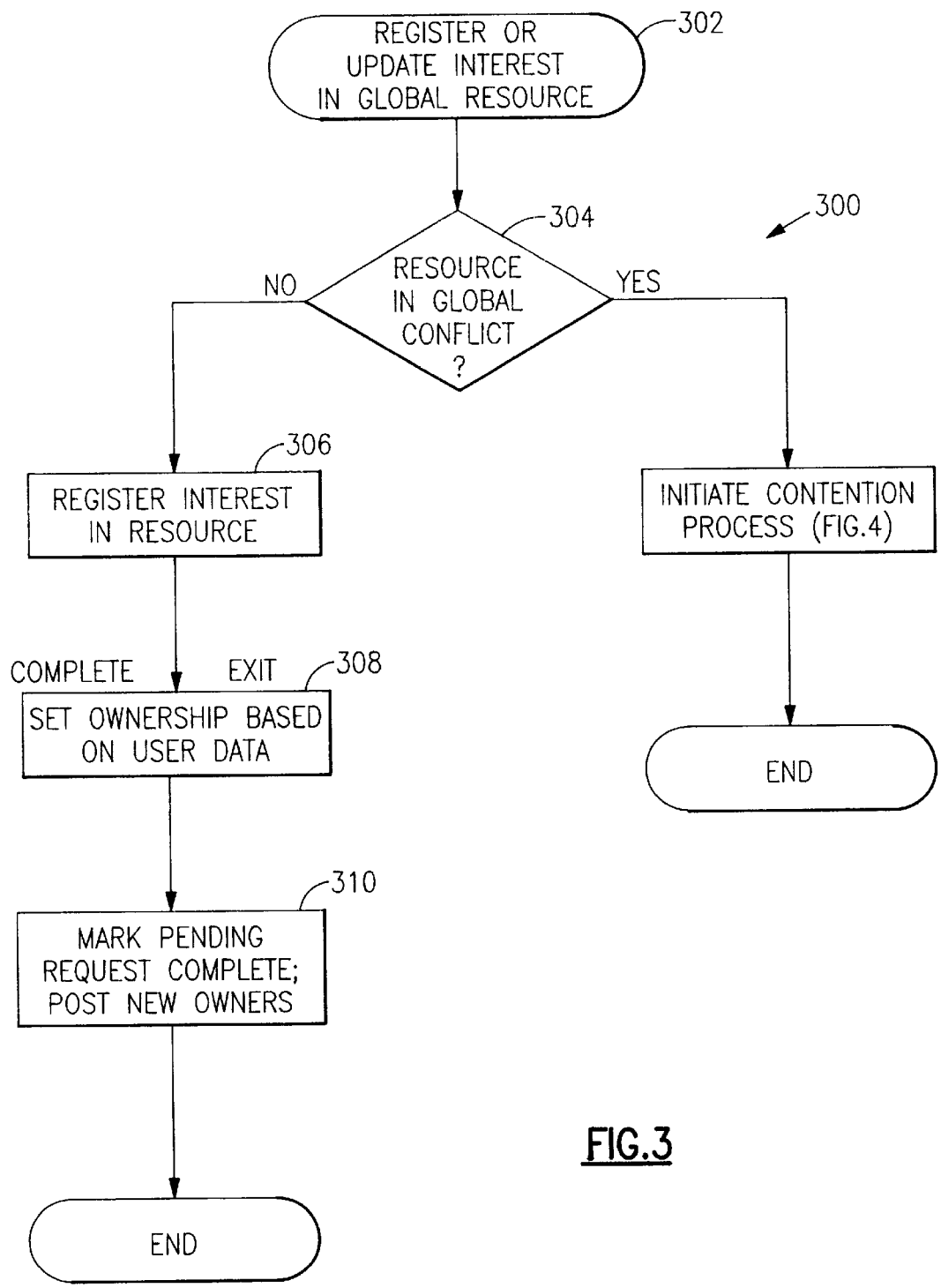
FIG. 3 shows the procedure for detecting global resource contention.

FIGS. 3–4 show the overall procedure used by the system lock manager 102 to detect and resolve contention between systems 104–108 for a given resource 116 and to advise affected systems of the results of the resolution procedure. The procedure is invoked whenever the user data 126 for a particular system is updated when requesting a resource 116 via an ENQ command or releasing a resource via a DEQ command. The following description is primarily with regard to contention processing as it is performed during the ENQ procedure. DEQ contention processing, insofar as it differs from ENQ contention processing, is described further below.

i. Contention Detection

FIG. 3. shows the procedure 300 performed by system lock manager 102 to detect global resource contention. Procedure 300 is initiated upon receiving a notification from a GRS service 110 of a new or changed interest in a resource 116 following an ENQ or DEQ request (step 302).

The system lock manager 102 first determines whether the resource 116 is in global conflict (step 304). The resource 116 is considered to be in global conflict if user data 126 has been defined for two or more systems and if any of the lock states 128 specified by the GRS services 110 have specified exclusive for the lock state. For an ENQ request, the lock states 128 are assessed as they exist after the new request; for a DEQ request, the lock states are assessed as they exist just before the request. The system lock manager 102 maintains the resource 116 in a state of global conflict until such time as there are no longer any conflicting requests made for the resource (i.e., there are no longer any requests waiting for access to the resource). This ensures that each time a new request is made, the system lock manager 102 drives the contention resolution procedure to be described.

If the system lock manager 102 determines that the resource 116 is not in global conflict, the system lock manager 102 registers the new or updated interest of the originating system 104 in the resource by making the new or updated user data 126 part of the global contention data for that resource (step 306). The system lock manager 102 then drives a "complete" exit provided by the GRS service 110 on the originating system 104.

The complete exit identifies which requesters 124, if any, are to become owners, based upon the current user data 126 for the system 104 (step 308). For this particular invocation of the complete exit, since there is no global contention (step 304) there are no waiters that are potential new owners. Therefore, for an ENQ request the only new owner will be the current requester 124, while for a DEQ request there will be no new owners. The GRS service 110 takes the identification of new owners from the complete exit, changes the state of the request 120 from "pending" to "complete", and returns a code to the requester 124 indicating whether it owns or is waiting for ownership of the resource 116, as shown in steps 232–236 of FIG. 2 (step 310).

On the other hand, if the system lock manager 102 determines that the resource 116 is in a global conflict, the system lock manager gathers all of the user data 126 for the resource and schedules the contention resolution procedure 400 shown in FIG. 4 (step 314).

ii. Contention Resolution

FIG. 4 shows the contention resolution procedure 400 invoked (step 314) by the contention detection procedure 300 (FIG. 3) whenever it determines (step 304) that contention has occurred. Such contention occurs whenever a GRS service 110 command updating user data 126 either causes a resource 116 to enter an incompatible state or is issued for a resource that is currently in an incompatible state. In the disclosed embodiment, the procedure 400 is performed on the system 104–108 that the system lock manager 102 designates as the global managing system for that resource. However, the procedure 400 could be performed centrally if desired.

Upon being invoked, the contention resolution procedure 400 determines, by analyzing all of the user data 126 for the resource 116, if ownership of the resource can be granted to requesters being served by one of the GRS services 110 (step 406). For an ENQ request this will never happen, as once the resource is in contention a DEQ is required to change ownership status. For a DEQ request, on the other hand, there will typically be new owners; the procedure 800 (FIG. 8) for identifying new owners is described below.

If the user data 126 for the new request specifies that the new requester 124 is an owner, the contention resolution procedure 400 updates the user data 126 by downgrading the requester to be a waiter for the resource 116. The GRS contention process then notifies the GRS service that made the SLM request that the request is complete and that the requester is waiting for the resource.

If there are any new owners (step 410), the GRS contention exit requests that the system lock manager 102 schedule a GRS notify exit on the systems 104–108 where the new owners are. Each GRS notify exit, upon being scheduled by the system lock manager 102, identifies which requesters 124 on that system are to become owners (step 414). The GRS service 110 on that system then updates the user data 126 with the new owners of the resource (step 416), then posts each new owner with an "owns resource" code indicating that the requester (i.e. requester 124) now owns the resource.

3. DEQ Procedure

A. GRS Service

Figure 5A:
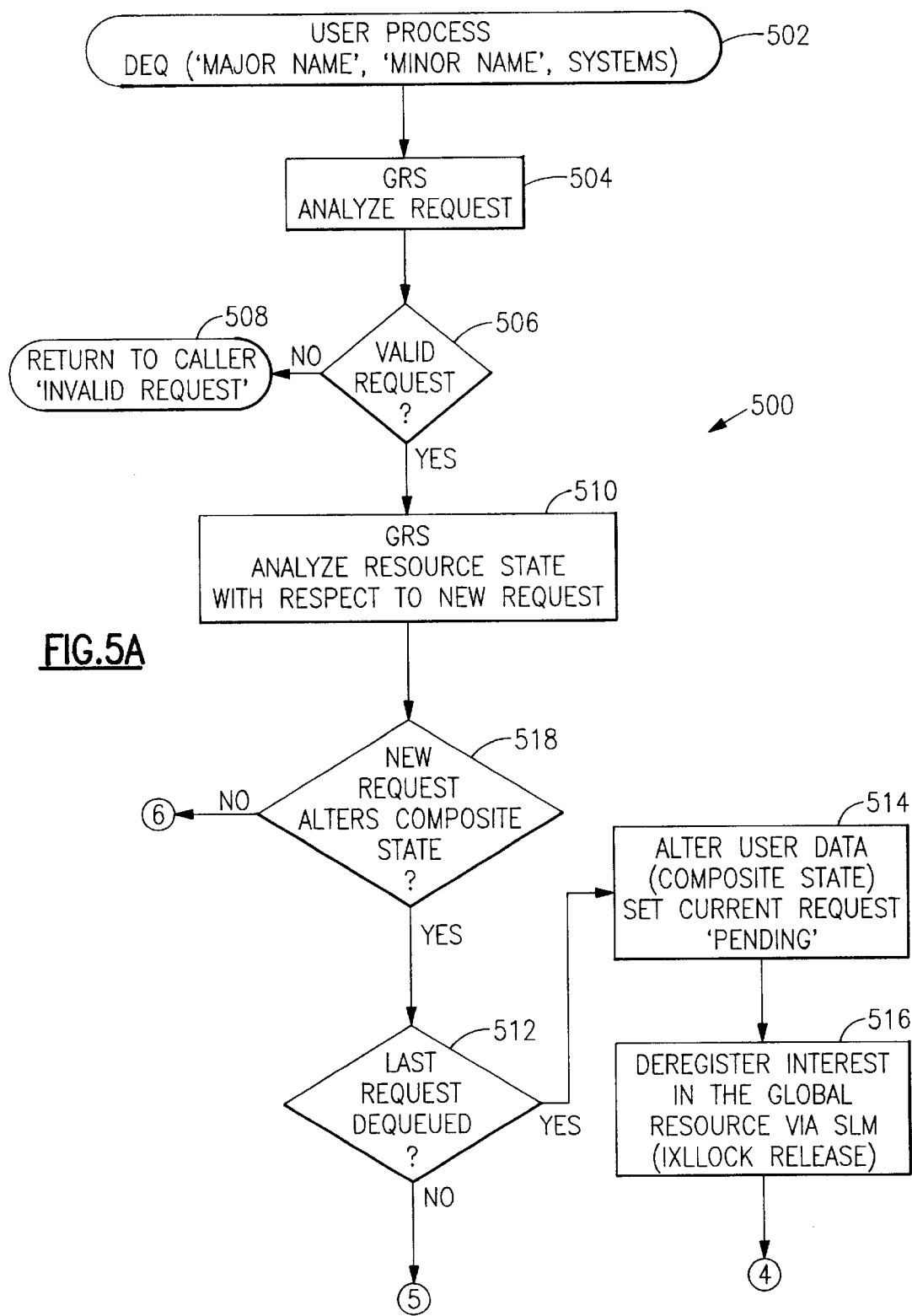
FIGS. 5A–5B show the DEQ procedure for dequeuing a resource request from a process.
Figure 5B:
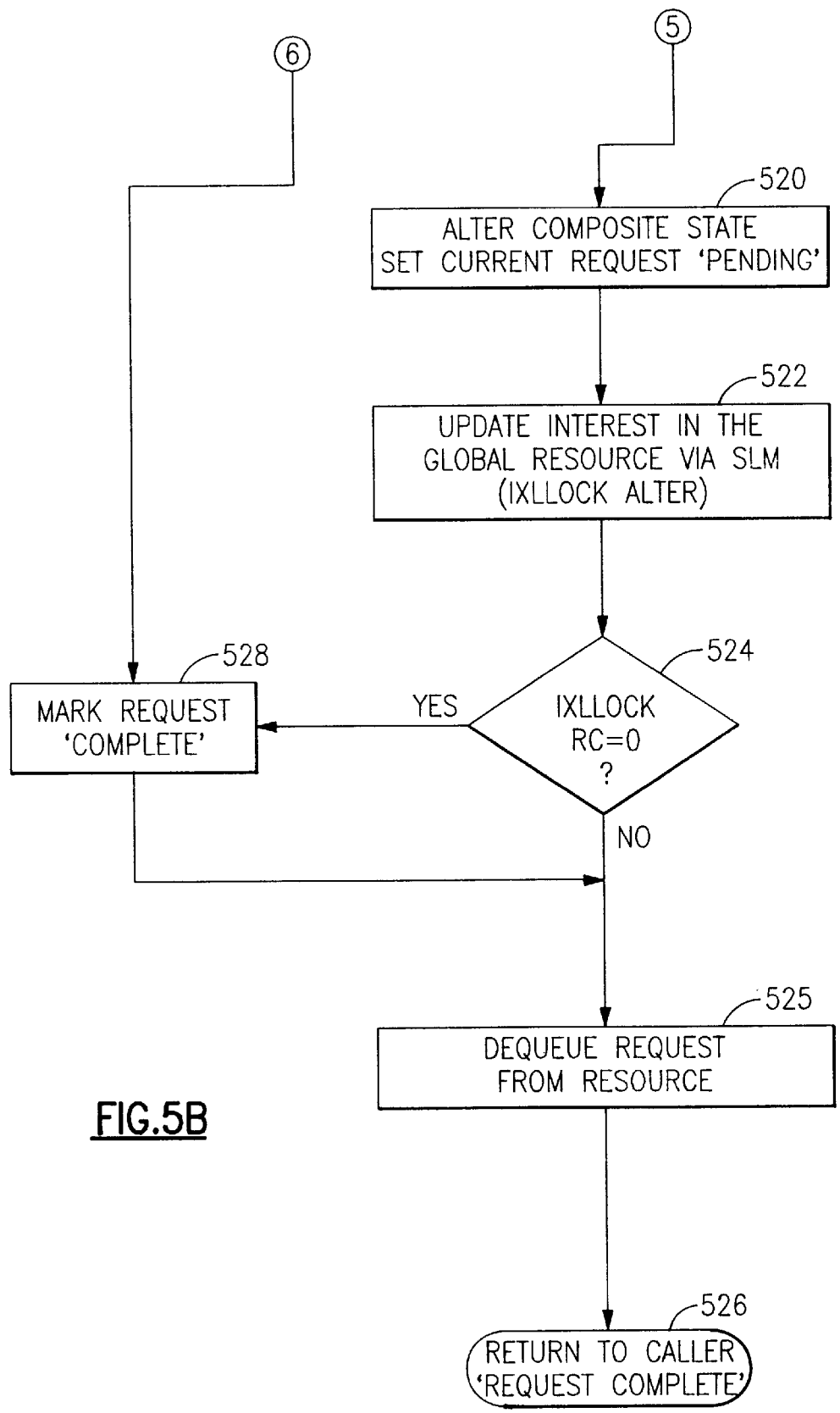

FIGS. 5A–5B show the DEQ procedure 500 invoked by a process to release a global resource. DEQ procedure 500 is invoked when a process on one of the systems, e.g. requester 124 on system 104, releases its request for a specified sysplex resource, e.g. resource 116 (step 502). The request has the format:

DEQ ('majorname','minorname',SYSTEMS)

shown in step 502, where the keyword DEQ denotes a DEQ request, the variables 'majorname' and 'minorname' denote the global resource being accessed, and the keyword SYSTEMS denotes that the request is for a global (sysplex-wide) resource.

Upon receiving a DEQ request from the requester 124 on the system 104, the GRS service 110 analyzes the request to determine whether or not it is valid (step 504). If the request is not valid (step 506), the GRS service 110 returns an "invalid request" code to the requester 124 (step 508).

If the request is valid, GRS service 110 updates the queue 118 by removing the entry 120 corresponding to the request from the head of the queue. The GRS service 110 then analyzes the resource state with respect to the request (step 510), and determines whether the DEQ request produces any changes in the local user data 126, as would occur if the relinquishing requester 124 were an exclusive owner or were the only shared owner on that system (step 518).

If the DEQ request does not change the local user data 126 (as would happen if there were other shared owners on the system), the GRS service 110 marks the request as complete (step 528) and notifies the requester 124 (step 526) without involving the system lock manager 102.

If the DEQ request does change the local user data 126, GRS service 110 determines whether the request would remove the last entry 120 from the queue 118 (step 512). If so, the GRS service 110 sets the user data 126 to all zeroes and marks the request as pending (step 514). The GRS service 110 then de-registers interest in the resource 116 by issuing a "release" command to the system lock manager 102 (step 516).

If the DEQ request changes the local user data 126 but does not remove the last entry 120 from the queue 118, the GRS service 110 updates the appropriate field in the user data 126 and marks the current request as pending (step 520). The GRS service 110 then notifies the system lock manager 102 of this update to the user data area 102 (step 522).

After issuing an "alter" (step 522) or "release" (step 516) command, the GRS service 110 waits for a response from the system lock manager 102 (step 524). If the GRS service 110 receives a return code of zero from the system lock manager 102, the GRS service 110 marks the request as complete (step 528).

If the GRS service 110 receives a nonzero return code from the system lock manager 102, this indicates that the alter or release command could not complete synchronously because of the continuing presence of global contention. In such a case, GRS service 110 leaves the request in the "pending" state and processes the next request. Processing for the pending request completes asynchronously with respect to the GRS service 110 as shown in FIGS. 3–4 and described above, just as for ENQ processing.

In either case, the GRS service 110 dequeues the request 120 from the resource 116 (step 525) and the GRS service 110 returns to the requester 124 with a code indicating the DEQ request has completed (step 526).

B. System Lock Manager: Contention Processing i. Contention Detection

Referring to FIG. 3, upon being notified of the update to the user data area 126 following the DEQ request (step 302), the system lock manager 102 determines if the resource was in global conflict at the time of the update (step 304). If not, the system lock manager 102 registers the changed interest in the resource 116 (step 306) and notifies the originating system 104 (step 308), which in turn notifies the requester 124 (step 310). If the resource is in global conflict, the system lock manager 102 schedules the GRS contention procedure 400 (step 304).

ii. Contention Resolution

The contention resolution procedure 400 as performed following a DEQ request differs from the procedure as performed following an ENQ request in that there are generally new owners (step 414) who are notified that the resource 116 is now available.

FIG. 8 shows in more detail the step 406 of identifying new owners when a current owner has relinquished ownership of a resource 116 using a DEQ command. The GRS contention process 400 identifies new owners at the level of systems 104–108, without regard to individual requesters 124 on a given system. It is the GRS services 110 on the systems 104–108 that notify the individual requesters 124.

Referring to FIG. 8, to identify new owners the GRS contention process 400 looks for the earliest waiter (exclusive or shared) in any of the user data areas 126 (step 802), and determines whether that waiter is an exclusive waiter or a shared waiter (step 804).

If the earliest waiter is an exclusive waiter (as will ordinarily be the case if the relinquishing process was the only shared owner in the sysplex), then that waiter is made the exclusive owner (step 806). The GRS contention process 400 notifies the GRS service 110 on the local system, which in turn notifies the new exclusive owner 124 (steps 410–418).

If the earliest waiter is a shared waiter, then the contention process 400 determines whether there are any exclusive waiters (step 808), since the action taken depends on the presence of such exclusive waiters. If there are no exclusive waiters anywhere, then all waiters are made owners (step 810). The GRS contention process 400 notifies the GRS services 110 on all systems with shared waiters that such waiters may become owners; the notified GRS services 110 in turn modify their queues 118 and user data areas 126 to make all shared waiters on their systems owners and notify the waiting requesters 124 to that effect (steps 410–418).

If, on the other hand, there is an exclusive waiter anywhere, then only those shared waiters that are older than the exclusive waiter are made owners (step 812). The contention procedure 400 notifies the GRS services 110 on systems having such earlier shared waiters that such waiters may become owners; the notified GRS services 110 in turn notify the shared waiters on their systems with earlier arrival times than the first exclusive waiter in the sysplex 100 they they are now owners (steps 410–418). Even though shared waiters later that the first exclusive waiter could be handled, notification is limited in this manner to make the serialization scheme "fair" to the first exclusive waiter, as against later-arriving shared waiters.

4. Sample ENQ Flow

Figure 9:
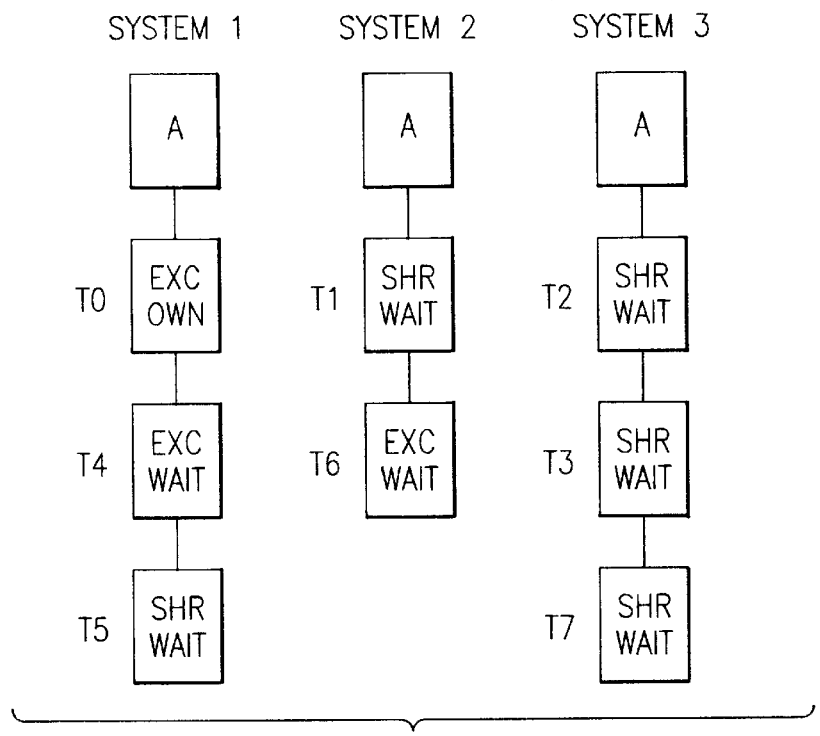
FIG. 9 shows the user data for the sysplex of FIG. 1 at the conclusion of the exemplary enqueue (ENQ) procedure described below.

FIG. 9 shows how the local resource queues 118 on the various systems 104–108 (Systems 1–3) for a given resource 116 are built by a series of ENQ requests.

Initially, in the absence of any owners or waiters for resource 116, there is no queue 118 or user data 126 for any of the systems 104–108.

At time T0, a request for exclusive ownership of resource A is made on System 1 (step 202). A system lock manager lock request will be made for resource ownership (step 216). This request will be granted and System 1's exclusive interest is registered in the system lock manager.

After T0, the user data 126 for System 1 (the only system having user data for the resource 116) is as follows:

SYSTEM 1 USER DATA

| Ownership | = EXCLUSIVE |
|---|---|
| First Shared Waiter | = none |
| First Exclusive Waiter | = none |

At time T1, a request for shared ownership of resource A is made on System 2 (step 202). A system lock manager lock request will be made for resource ownership (step 216). This request cannot be granted but System 2's shared interest and the time (T1) are recorded in the system lock manager user data for System 2.

After T1, the user data 126 for Systems 1–2 (the only systems having user data for the resource 116) is as follows:

SYSTEM 1 USER DATA

| Ownership | = EXCLUSIVE |
|---|---|
| First Shared Waiter | = none |
| First Exclusive Waiter | = none |

SYSTEM 2 USER DATA

| Ownership | = none |
|---|---|
| First Shared Waiter | = T1 |
| First Exclusive Waiter | = none |

At time T2, a request for shared ownership of resource A is made on System 3 (step 202). A system lock manager lock request will be made for resource ownership (step 216). This request cannot be granted but System 3's shared interest and the time (T2) is recorded in the system lock manager user data for System 3.

After T2, the user data 126 for the various systems is as follows:

SYSTEM 1 USER DATA

| Ownership | = EXCLUSIVE |
|---|---|
| First Shared Waiter | = none |
| First Exclusive Waiter | = none |

SYSTEM 2 USER DATA

| Ownership | = none |
|---|---|
| First Shared Waiter | = T1 |
| First Exclusive Waiter | = none |

SYSTEM 3 USER DATA

| Ownership | = none |
|---|---|
| First Shared Waiter | = T2 |
| First Exclusive Waiter | = none |

At time T3, a request for shared ownership of resource A is made on System 3 (step 202). Because System 3 already has a shared waiter for resource A, this request will be immediately made a shared waiter (steps 224–226). No system lock manager lock request or user data update is necessary.

At time T4, a request for exclusive ownership of resource A is made on System 1 (step 202). Because System 1 already owns resource A exclusively, it will place the exclusive request time (T4) in the user data (step 220) and make a system lock manager lock request to update the user data (step 222).

After T4, the user data 126 for the various systems is as follows:

SYSTEM 1 USER DATA

| Ownership | = EXCLUSIVE |
|---|---|
| First Shared Waiter | = none |
| First Exclusive Waiter | = T4 |

SYSTEM 2 USER DATA

| Ownership | = none |
|---|---|
| First Shared Waiter | = T1 |
| First Exclusive Waiter | = none |

SYSTEM 3 USER DATA

| Ownership | = none |
|---|---|
| First Shared Waiter | = T2 |
| First Exclusive Waiter | = none |

At time T5, a request for shared ownership of resource A is made on System 1 (step 202). Because System 1 already owns resource A exclusively, it will place the shared request time (T5) in the user data (step 220) and make a system lock manager lock request to update the user data (step 222).

After T5, the user data 126 for the various systems is as follows:

SYSTEM 1 USER DATA

| Ownership | = EXCLUSIVE |
|---|---|
| First Shared Waiter | = T5 |
| First Exclusive Waiter | = T4 |

SYSTEM 2 USER DATA

| Ownership | = none |
|---|---|
| First Shared Waiter | = T1 |
| First Exclusive Waiter | = none |

SYSTEM 3 USER DATA

| Ownership | = none |
|---|---|
| First Shared Waiter | = T2 |
| First Exclusive Waiter | = none |

At time T6, a request for exclusive ownership of resource A is made on System 2. Because System 2 is already waiting for Resource A, it will place the exclusive request time (T6) in the user data (step 220) and make a system lock manager lock request to update the user data and increase its interest in resource A from shared to exclusive ownership (step 222).

After T6, the user data 126 for the various systems is as follows:

SYSTEM 1 USER DATA

| Ownership | = EXCLUSIVE |
|---|---|
| First Shared Waiter | = T5 |
| First Exclusive Waiter | = T4 |

SYSTEM 2 USER DATA

| Ownership | = none |
|---|---|
| First Shared Waiter | = T1 |
| First Exclusive Waiter | = T6 |

SYSTEM 3 USER DATA

| Ownership | = none |
|---|---|
| First Shared Waiter | = T2 |
| First Exclusive Waiter | = none |

At time T7, a request for shared ownership of resource A is made on System 3 (step 202). As with the request at time T3, because System 3 already has a shared waiter for resource A, this request will be immediately made a shared waiter (steps 224--226). No system lock manager lock request or user data update is necessary.

Note that the user data 126 for each system only contains the ownership status (i.e., whether the system owns the resource 116 and, if so, whether on an exclusive or shared basis) and the time of the first shared and/or exclusive waiter for that system. It does not keep track of each waiter 120 on the local queue 118.

5. Sample DEQ Flow

Figure 10:
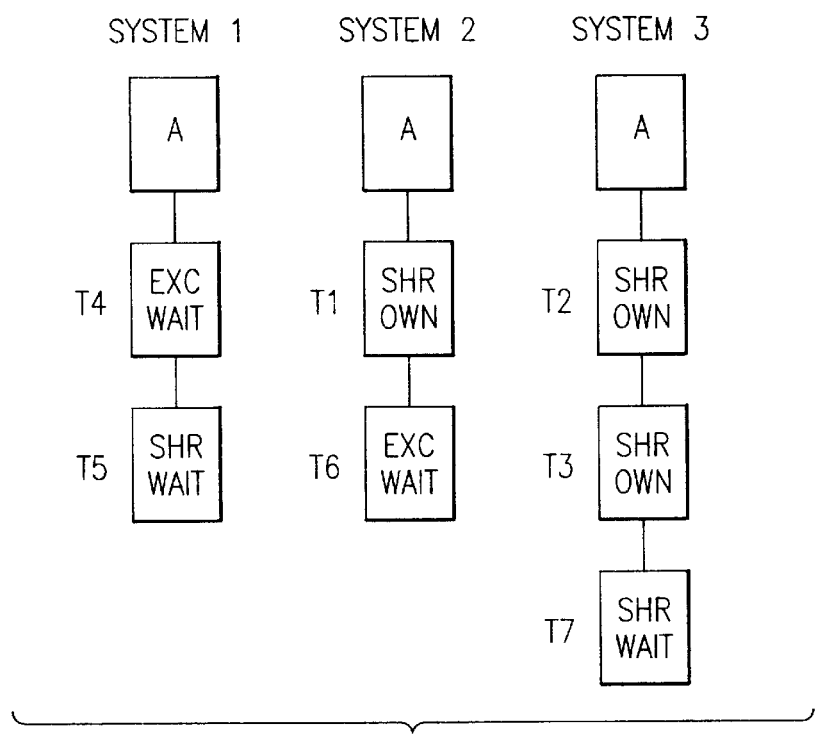
FIG. 10 shows the user data for the sysplex of FIG. 1 at the conclusion of the exemplary dequeue (DEQ) procedure described below.

FIG. 10 shows how the local resource queues 118 on the various systems 104–108 for a given resource 116 are altered by a DEQ request.

When the exclusive owner of resource A at Time T0 issues a DEQ to release the resource (step 502), this request is passed back to the system lock manager 102 (step 522). The user data 126 created for resource A will be examined and the next owner of the resource will be determined and that user notified.

As noted above, the first determination to be made is whether the next owner is an exclusive requester or a shared requester. This is important since only one exclusive request can own the resource at a time whereas multiple shared requests can own the resource at the same time. The first shared waiter time in the user data is T1. The first exclusive waiter time in the user data is T4.

Because the shared waiter time (T1) is less than the exclusive waiter time (T4), the resource will be owned shared. Next, the user data 126 will be interrogated to determine if any other shared requests can also be granted ownership.

It is determined that the shared waiter on System 3 can also be granted ownership. This system, along with System 2, will be notified that any shared waiters on those systems with request times before T4 (the first exclusive waiter time) can be granted shared ownership. This will result in shared requesters at times T1, T2 and T3 being granted shared ownership.

FIG. 10 shows the updated local resource queues 118 after the DEQ is processed, while the user data 126 is shown below. Note that the exclusive owner at time T0 has been deleted due to the DEQ request.

SYSTEM 1 USER DATA

| Ownership | = none |
|---|---|
| First Shared Waiter | = T5 |
| First Exclusive Waiter | = T4 |

SYSTEM 2 USER DATA

| Ownership | = SHARED |
|---|---|
| First Shared Waiter | = none |
| First Exclusive Waiter | = T6 |

SYSTEM 3 USER DATA

| Ownership | = SHARED |
|---|---|
| First Shared Waiter | = T7 |
| First Exclusive Waiter | = none |

Various modifications of the implementation described above will be apparent to those skilled in the art. Thus, while the contention procedure has been described as being performed on a system selected by the system lock manager, it could also be performed centrally if desired.

What is claimed is:

1. A method for serializing a request for access to a resource originating from a requester in a system of a multisystem complex, said complex having a global manager for managing contention between said systems for access to said resource, said method comprising the steps of:
   (a) maintaining for each of said systems local contention data indicating contention between requesters on said system for access to said resource;
   (b) maintaining for each of said systems a local contention summary summarizing said local contention data, said local contention summary being used by said global manager to determine whether there is global contention between said systems for said resource; and
   (c) in response to a request for access to said resource originating from a requester on one of said systems, having said system perform the steps of:
      (1) determining whether said request requires an update of the local contention summary for said system;
      (2) if said request does not require an update of said local contention summary, processing said request in accordance with the local contention data for said system; and
      (3) if said request requires an update of said local contention summary, notifying said global manager of said update and processing said request in accordance with a response received from said global manager.

2. The method of claim 1 wherein said response indicates whether there is global contention for said resource.

3. The method of claim 1 wherein said request is for a specified mode of access to said resource, said system determining that no update of said local contention summary comprising is required if there are currently any waiters on said system for the requested mode of access to said resource.

4. The method of claim 1 wherein said local contention data comprises, for each of said systems, a queue of entries representing requesters from that system for access to said resource.

5. The method of claim 1 wherein the local contention summary for each system indicates whether a requester from that system has current access to said resource.

6. The method of claim 1 wherein the local contention summary for each system indicates whether a requester from said system is awaiting access to said resource.

7. The method of claim 1 wherein the local contention summary for each system indicates when the earliest requester awaiting access to said resource requested access to said resource.

8. The method of claim 1 wherein the local contention summary for each system indicates when the earliest requester awaiting exclusive access to said resource requested access to said resource.

9. The method of claim 1 wherein the local contention summary for each system indicates when the earliest requester awaiting shared access to said resource requested access to said resource.

10. The method of claim 1 wherein said global manager maintains global contention data indicating contention between said systems for access to said resource, said global contention data being based upon the local contention summaries for each of said systems, said global manager, in response to receiving a notification of said update from said system, performing the steps of:

determining whether said update leaves said resource in global contention;

if said update does not leave said resource in global contention, transmitting a response to said requester indicating that said resource is not in global contention; and if said update leaves said resource in global contention, transmitting a response to said requester indicating that said resource is in global contention.

11. The method of claim 1 wherein said system, in response to a request from said requester to release said resource, performs said steps (c)(1)–(c)(3) for said request to release said resource.

12. The method of claim 2 wherein said system commits said update and processes said request in accordance with said local contention data if said response indicates the absence of global contention for said resource.

13. The method of claim 2 wherein said system denies said request if said response indicates the presence of global contention.

14. The method of claim 13 wherein said system cancels said update if said update makes said requester an owner of said resource.

15. The method of claim 4 wherein each of said entries in said queue indicates whether the requester currently has access to said resource.

16. The method of claim 4 wherein each of said entries in said queue indicates whether the requester requested exclusive or shared access to said resource.

17. The method of claim 4 wherein each of said entries in said queue indicates when the requester requested access to said resource.

18. The method of claim 5 wherein the local contention summary for each system indicates whether said current access is exclusive or shared.

19. The method of claim 10 wherein said global manager updates said global contention data in accordance with said update of said local contention summary.

20. The method of claim 10 wherein the local contention summary for each system comprises a lock state that is set to exclusive if any requester on that system is requesting exclusive access to said resource.

21. The method of claim 19 wherein said global manager updates said global contention data to identify said system as a waiter for said resource if said update of said local contention summary identifies said system as an owner of said resource and said resource is in global contention.

22. The method of claim 20 wherein said resource is determined to be in global contention if two or more of said systems have requesters for access to said resource and the lock state of at least one of said two or more systems is set to exclusive.

23. The method of claim 11 wherein said global manager, in response to receiving a notification of an update from said system following a request to release said resource, performs the steps of:

determining whether said resource was previously in global contention;

if said resource was not previously in global contention, transmitting a response to said requester indicating that said resource is not in global contention; and if said resource was previously in global contention, transmitting a response to said requester indicating that said resource is in global contention.

24. The method of claim 11 wherein said global manager, in response to receiving a notification of an update from said system following a request to release said resource, performs the steps of:

determining the system having an oldest waiter for access to said resource; and notifying said system having said oldest waiter that said resource is available.

25. The method of claim 11 wherein said global manager, in response to receiving a notification of an update from said system following a request to release said resource, performs the steps of:

determining the system having an oldest waiter for access to said resource;

if said oldest waiter is awaiting exclusive access to said resource, notifying said system having said oldest waiter that said resource is available;

if said oldest waiter is awaiting shared access to said resource, determining whether any system has a waiter for exclusive access to said resource;

if no system has a waiter for exclusive access to said resource, notifying all of said systems with waiters for access to said resource that said resource is available;

if any system has a waiter for exclusive access to said resource, notifying all of said systems with waiters for access to said resource that are older than said waiter for exclusive access to said resource that said resource is available for waiters that are older than said waiter for exclusive access.

26. The method of claim 25 wherein each of said systems with waiters, upon being notified that said resource is available, notifies the waiters on said system that said resource is available.

27. The method of claim 25 wherein each of said systems with waiters that are older than said waiter for exclusive access, upon being notified that said resource is available for waiters that are older than said waiter for exclusive access, notifies the waiters on said system that are older than said waiter for exclusive access that said resource is available.

28. Apparatus for serializing a request for access to a resource originating from a requester in a system of a multisystem complex, said complex having a global manager for managing contention between said systems for access to said resource, said apparatus comprising, on at least one of said systems:

(a) means for maintaining local contention data indicating contention between requesters on said system for access to said resource;

(b) means for maintaining a local contention summary summarizing said local contention data, said local contention summary being used by said global manager to determine whether there is global contention between said systems for said resource;

(c) means responsive to a request for access to said resource originating from a requester on said system for determining whether said request requires an update of said local contention summary;

(d) means responsive to a determination that said request does not require an update of said local contention summary for processing said request in accordance with said local contention data; and (e) means responsive to a determination that said request requires an update of said local contention summary for notifying said global manager of said update and processing said request in accordance with a response received from said global manager.

* * * * *